July 16, 1963 E. HILL 3,097,417
TOOL HOLDER WITH REPLACEABLE TIP
Filed Oct. 15, 1958

Inventor
EDWARD HILL
By
JOHN GIBSON SEMMES
Attorney

United States Patent Office 3,097,417
Patented July 16, 1963

3,097,417
TOOL HOLDER WITH REPLACEABLE TIP
Edward Hill, Sheffield, England, assignor to General
Electric Company, a corporation of New York
Filed Oct. 15, 1958, Ser. No. 767,384
Claims priority, application Great Britain Oct. 25, 1957
3 Claims. (Cl. 29—96)

This invention relates to lathe and like tools with replaceable and reversible tips, particularly carbide tips, capable of being moved to bring a fresh cutting edge into position when a previous edge is no longer serviceable, and inverted to make available the cutting edge round its other face.

The object of the invention is to provide for simple securing of such a tip with any of its cutting edges in operative position. A further object of the invention is to provide a tool-holder for such a tip with ample clearance for removal of chips. Yet another object is to provide a replaceable and reversible tip that itself acts as a chip-breaker.

According to the present invention, a tool-holder for use with a replaceable and reversible flat tip with parallel faces providing cutting edges round both faces has a shank with an open recess in the end of one face, with a rear edge normal to the base of the recess, against which edge may be placed a side of a tip, which side is normal to the faces of the tip, with another part of the tip in position to present a cutting edge at the open end of the recess by the face remote from the base of the recess, a round hole through the shank and emerging into the base of the recess, and a pin fitting the tapped hole and provided with an eccentric cylindrical extension protruding into the recess, the extension serving to fit a cylindrical hole through a tip and to urge the normal side of the tip against the normal rear edge of the recess when the pin is turned in one direction, so that the tip may have either face applied to the base of the recess and held to the base by the frictional grip exerted between the extension and the hole in the tip and consequently between the side of the tip and the rear edge of the recess.

The hole from face to face of the tip must of course be central, so that the tip may be turned to any cutting position and yet have a rear side in position to bear on the rear edge of the recess. Thus, the hole may be centrally of a square tip or an equilateral triangular tip, or at the centre of a circular tip. A part-rotation of the pin causes the eccentric extension to lock the tip by the frictional grip exerted. The base provides the necessary support for the tip when the latter is subjected to cutting load.

A partial turn of the pin releases the tip, which may then be lifted and turned and/or inverted to bring another cutting edge into operative position, and then locked once again by turning the pin.

The round hole may be tapped and the pin threaded, so that the pin is retained in the hole even when it is not turned to lock a tip in the recess. However, the pin may be a fit in a plain hole, with means to prevent axial movement of the pin, e.g., a groove round the pin to receive a locking member in a transverse hole in the shank.

The invention will now be further described with reference to the accompanying drawings, in which FIGURES 1 and 2 are respectively a side elevation and plan of a tool-holder with a square tip;

Figure 4:
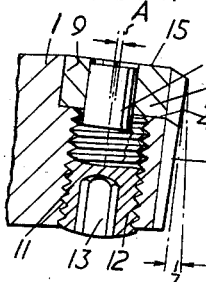
FIGURE 4 is a section on the line 4—4 of FIGURE 3.
Figure 8:
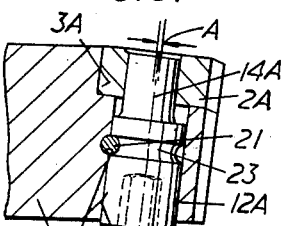

FIGURE 8 corresponds to FIGURE 4 but shows an alternative construction; and

FIGURES 9 to 12 are plan views of tool-holders with other forms and dispositions of tips.

Figure 1:
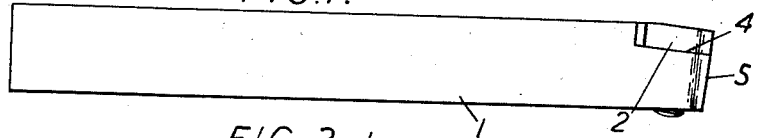
Figure 2:
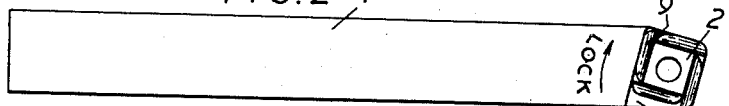
Figure 3:
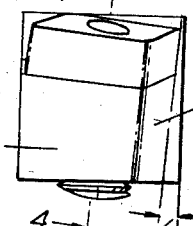
FIGURE 3 is an end elevation, to a larger scale, of the tip end of the tool-holder.
Figure 5:
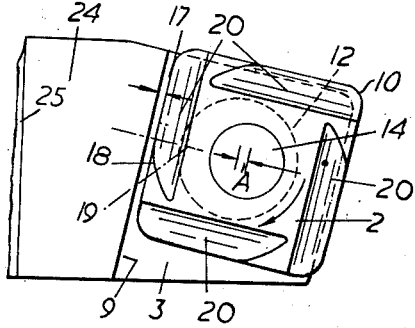
FIGURE 5 is a plan, to a still larger scale, of a slightly modified tool-holder with a square tip.

In FIGURES 1 and 2, a square shank 1 has a square tip 2, e.g., of tungsten or other carbide, replaceably supported in a recess 3. The base 4 of the recess is flat, and normal to both the front end 5 and side face 6 of the shank, which are inclined at angles 7, 8 (FIGURES 4 and 3) of say 5° to provide front and side clearance. As shown in FIGURES 2 and 5, the rear edge 9 of the recess 3 is not at right-angles to the sides of the shank 1, and the side face 6 of the shank is at right-angles to the edge 9, to present any rounded corner 10 of the tip 2 at a suitable cutting position in relation to the faces 5, 6. The rear edge 9 of the recess is normal to the base 4 of the recess.

In FIGURE 4, a tapped hole 11, normal to the base 4 of the recess 3 and centrally of the square of which the faces 5, 6 and edge 9 define three sides, receives a screwed pin 12, with a hexagon socket 13 to fit a key. The screwed length of the pin 12 stops below the base 4 of the recess 3, but the pin continues into an extension 14, slightly eccentric, say by 0.040", to the pin, as indicated at A in FIGURES 4, 5 and 8. The extension 14 ends close to the upper face 15 of the tip 2, and preferably does not protrude beyond that face.

Figure 7:
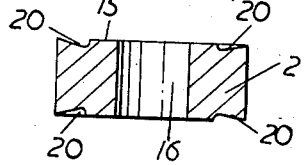
FIGURE 7 is a cross-section of a tip.

The tip 2 is as thick as the recess 3 is deep at its edge 9. It has a central hole 16 (FIGURE 7) normal to the faces of the tip to make a close fit with the extension 14. With the pin 12 rotated to throw the eccentric extension away from the edge 9 of the recess 3, the tip 2 may be placed on the extension with slight clearance 17 (FIGURE 5), less than the eccentricity A of the extension 14, between the edge 9 and the adjacent side 18 of the tip. Rotation of the pin 12 in the direction of the arrow causes the extension 14 to force the side 18 tightly to the edge 9, and the extension reaches a self-locking position when its throw falls short of the perpendicular 19 from the axis of the pin 12 to the edge 9. This ensures that the pin 14 cannot be forced through its self-locking position.

The locking pressure of the pin 14 is exerted through the substantial thickness of the material of the tip 2 between the hole 16 and the side 18 and is well distributed along the side 18, substantial pressure can be exerted without damaging the tip, and this pressure results in intense frictional contact between the extension 14 and the inner side of the hole 16, and also between the side 18 and the edge 9, to hold the tip 2 firmly to the base of the recess 3. The tip thus well supported by the shank is able to take heavy cutting thrust, and the locking, though purely frictional, remains firm even when the tip is used under conditions introducing vibration, as when cutting material with a frequently interrupted surface.

Since the extension 14 does not or need not, protrude materially at the upper surface 15 of the tip 2, free movement is provided for chips from whichever cutting edge of the tip 2 is in use. There are eight such edges, since the tip may be inverted when the four edges at one side are worn out. Behind each edge is a chip-breaker groove 20 the face of which may be inclined in accordance with the top rake desired. Thus, by inclining it at an angle greater than that of the front and side clearances 7, 8, positive rake may be provided at both cutting edges 5, 6. A chip reaching the inner edge of the groove 20 is face 15, and thus is quickly broken. Moreover, the absence of obstruction to chip movement discourages pressure between the chip and the immediate vicinity of the cutting edge, such as could lead to "welding" of metal to the tip and a breakdown of effective cutting by the edge even before the edge itself had been subjected to much wear.

In FIGURE 8, a tip 2A is held in a recess 3A in a shank 1A by an eccentric extension 14A of a plain round pin 12A fitting a plain hole 11A, the pin 12A being retained by a locking pin 21 driven into a transverse hole 22 in the shank and fitting one side of a groove 23 in the pin.

Figure 6:
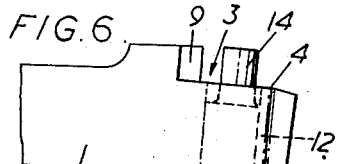
FIGURE 6 is a side elevation of a tool-holder, also slightly modified, with the tip removed.

For many purposes, the lateral dimensions of the tips lie within the width of the shank, which may then be made of plain square or rectangular stock, for fitting in standard tool-boxes. The virtual absence of projections above or below the shank makes the tool-holder easy to apply in limited space in a machine tool. However, if the size of tip demands it, the tip may be carried on a head, such as 24 in FIGURE 5, wider than the shank 25. Again the depth of the shank may be reduced, as 26 in FIGURE 6.

Figure 9:
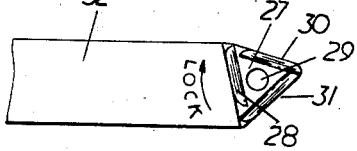
Figure 10:
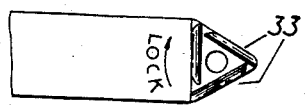
Figure 11:
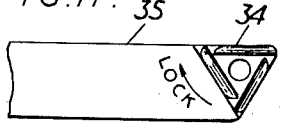
Figure 12:
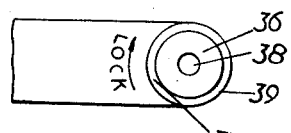

Just as a square, invertible tip, as in FIGURES 1 to 7, provides a total of eight cutting edges, an equilateral triangular tip provides a total of six edges. FIGURE 9 shows a triangular tip 27 secured against the edge 28 of a recess by an eccentric extension 29, the exposed cutting edges 30, 31 being asymmetrical with respect to the shank 32. In FIGURE 10, the exposed cutting edges 33 are symmetrical. In FIGURE 11, one edge 34 is in line with one side 35 of the shank. FIGURE 12 shows a modification in which the tip 36 is circular and fits against the curved edge 37 of a recess, it being locked by means of an eccentric extension 38, the tip being rotatable to bring the whole of its periphery into use by stages. Such a circular tip may also be invertible, so that two complete peripheries provide cutting edges. Each edge may have a continuous chip-breaker groove 39.

The eccentric extension should be hardened to withstand repeated use, and indeed the whole of the pin and the extension may be hardened. Advantageously the tip-end of the tool-holder is lightly case-hardened, say to 0.010" deep, to resist wear on the faces immediately below the cutting edges of the tip. Again, for the same purpose, it may be hard chromium plated.

What I claim is:

1. In a tool holder, an invertible and indexible flat carbide tip having parallel faces and a peripheral surface normal to said faces to provide cutting edges around said faces and a central hole normal to said faces, a shank having an open recess at one end to receive the tip, said open recess defined by a base and a rear surface normal to the base, the tip resting in the open recess of said shank with its parallel faces parallel to the base of the recess and its peripheral surface abutting the rear surface of the recess, a round hole through the shank normal to the base of the recess, a pin rotatably fitting the hole and provided with an eccentric cylindrical extension protruding into the recess to fit the hole in the tip, and means whereby the pin may be rotated to hold the tip in the recess solely by the frictional grip exerted between the eccentric extension of the pin and the central hole in the tip and between the peripheral surface of the tip and the abutting rear surface of the recess.

2. In a tool holder, an invertible and indexible flat carbide tip having parallel faces and a peripheral surface normal to said faces to provide cutting edges around said faces and a central hole normal to said faces, a shank having an open recess at one end to receive the tip, said open recess defined by a base and a rear surface normal to the base, the tip resting in the open recess of said shank with its parallel faces parallel to the base of the recess and its peripheral surface abutting the rear surface of the recess, a round tapped hole through the shank normal to the base of the recess, a screwed pin fitting the hole and provided with an eccentric cylindrical extension protruding into the recess to fit the hole in the tip, and means whereby the pin may be rotated to hold the tip in the recess solely by the frictional grip exerted between the eccentric extension of the pin and the central hole in the tip and between the peripheral surface of the tip and the abutting rear surface of the recess.

3. In a tool holder, an invertible and indexible flat carbide tip having parallel faces and a peripheral surface normal to said faces to provide cutting edges around said faces and a central hole normal to said faces, a shank having an open recess at one end to receive the tip, said open recess defined by a base and a rear surface normal to the base, the tip resting in the open recess of said shank with its parallel faces parallel to the base of the recess and its peripheral surface abutting the rear surface of the recess, a round plain hole through the shank normal to the base of the recess, a pin rotatably fitting the hole and provided with an eccentric cylindrical extension protruding into the recess to fit the hole in the tip with means to prevent axial movement of the pin, and means whereby the pin may be rotated to hold the tip in the recess solely by the frictional grip exerted between the eccentric extension of the pin and the central hole in the tip and between the peripheral surface of the tip and the abutting rear surface of the recess.

References Cited in the file of this patent

UNITED STATES PATENTS

| 663,455 | Muehlberg | Dec. 11, 1900 |
| 945,081 | Burt | Jan. 4, 1910 |
| 1,056,429 | Maier | Mar. 18, 1913 |
| 1,838,520 | Archer | Dec. 29, 1931 |
| 2,223,831 | Luers | Dec. 3, 1940 |
| 2,314,665 | Specht | Mar. 23, 1943 |
| 2,581,609 | Small | Jan. 8, 1952 |
| 2,598,581 | McKenna | May 27, 1952 |
| 2,595,090 | Middleton | Apr. 29, 1952 |
| 2,630,725 | Black | Mar. 10, 1953 |
| 2,641,049 | Kennicott | June 9, 1953 |
| 2,645,003 | Thompson | July 14, 1953 |
| 2,683,302 | Bader | July 13, 1954 |
| 2,805,467 | Greenleaf | Sept. 10, 1957 |

FOREIGN PATENTS

| 15,998 | Great Britain | July 11, 1907 |
| 320,809 | Great Britain | Oct. 24, 1929 |
| 350,706 | Great Britain | June 18, 1931 |